Dec. 19, 1967

F. W. FALK ETAL 3,359,420

ELECTRICAL CALIBRATION MEANS FOR RADIAC EQUIPMENT

Filed Nov. 24, 1964

INVENTORS,
FRED W. FALK &
JAMES M. MC CUE.

BY Jack H Linscott

ATTORNEY.

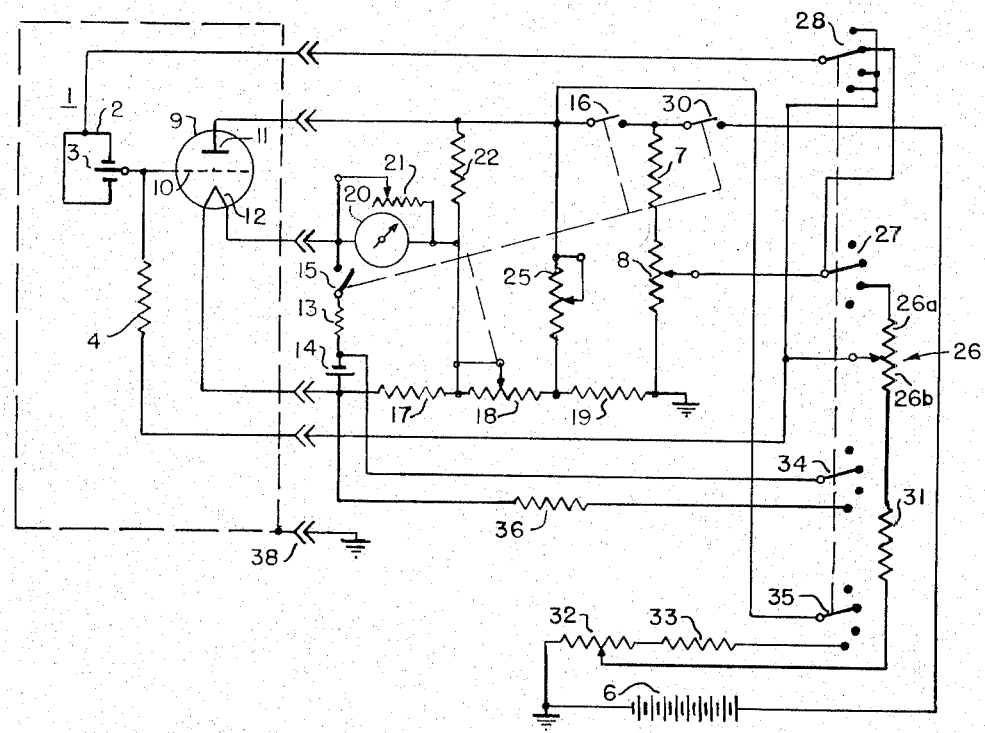

United States Patent Office 3,359,420
Patented Dec. 19, 1967

3,359,420
ELECTRICAL CALIBRATION MEANS FOR
RADIAC EQUIPMENT
Fred W. Falk, U.S. Army Communication Agency, Europe, A.P.O. 403, New York, N.Y., and James M. McCue, 29 Borden St., Shrewsbury, N.J. 07701
Filed Nov. 24, 1964, Ser. No. 420,240
6 Claims. (Cl. 250—83.3)

ABSTRACT OF THE DISCLOSURE

Radiological survey instrument having incorporated therein electrical means for the operator of the instrument to check the accuracy of the instrument without resorting to use of radio-active material of known intensity.

---

The invention described in the present specification and claims may be manufactured and used by or for the Government for governmental purposes without the payment to us of any royalty thereon.

Radiological meter equipment finds little, if any, use in times of peace. It must, however, be in a constant state of readiness and capable of reliable and accurate operation on instant notice and must be where needed, generally widely distributed in the lower echelons of the military and civil defense agencies. To provide a measure of confidence in indications of radiac meters they are periodically tested.

Traditionally, the testing and calibration of such equipment involves subjecting the instrument to a known intensity of emanations of radioactive materials to check the accuracy of the meter indications and performing adjustment while the equipment is so exposed to bring about a correct indication. Because of safety oriented restrictions imposed on the issue and transport of radioactive materials, radiological detection equipment must be sent to special testing facilities for calibration.

Experience has taught that such periodical testing and calibration is not adequate to assure the continuous reliability and accuracy of the equipment. The frequency of testing and calibration that can be achieved in practice is too low. Upset calibrations and battery voltage changes have been frequent causes of the equipment being inaccurate in indication.

Because an inaccurate meter may cause the user to remain in a radioactive area long enough to get a severe or lethal dose of radiation, it constitutes a hazard for the user, and more seriously, for other personnel sent by a commander into the radiation area in a decision based on inaccurate meter readings.

The aim of the present invention is to provide means for testing and method for recalibrating radiac meter equipment at any time desired and without need for radioactive sources. The means is intended for supplementing and greatly reducing the frequency for periodic calibration against known sources of radiation, rather than replacing it entirely. The present invention provides an electrical means for the operator of the instrument to check the accuracy of his instrument immediately prior to the taking of a reading of the radiation intensity and the means to accomplish adjustments to make the equipment accurate should it be found inaccurate. This assures confidence of both the operator and the commanding officer in the accuracy of readings obtained, and greatly diminishes the prospect of greater than expected doses.

For the purpose of more fully disclosing the invention, reference is made to the appended drawings in which:

FIGURE 4 shows still another form of the invention with a provision for making separate tests of the battery voltage; and FIGURE 5 shows a diagram of the positions of the function switch of FIGURE 4.

Figure 1:
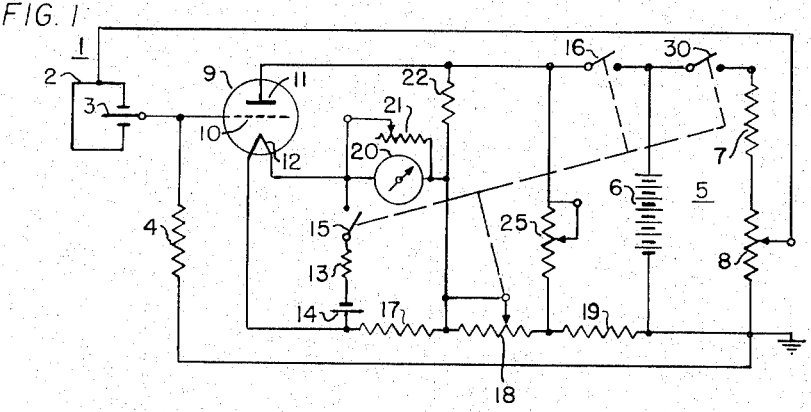
FIGURE 1 shows a conventional instrument for measuring radiation intensity.

Referring to FIGURE 1, the conventional radiometer comprises an ionization chamber type detector 1, having an envelope 2 permeable to the radiation to be measured and coated inside with a conducting material. Electrically insulated from the rest of the envelope coating and extending from and through an end wall of the envelope is a central electrode 3. To the exterior end of the central electrode is connected a load resistor 4. The ionization chamber in series with the resistor 4 is connected across a source of potential 5. While an ionization chamber is illustrated, it is to be understood that any detector responsive to radiation to vary the resistance thereacross may be utilized. The source of potential 5 consists of a battery 6 and circuit having a fixed resistor 7 and a potentiometer 8. The conducting coating of the envelope is connected to the movable contact of the potentiometer 8, providing a positive potential thereto, that is adjustable within the range of operation of the potentiometer 8. The lower end of the load resistor 4 is connected to the negative terminal of the potential source and to ground.

Radiation impinging on the envelope operates to ionize the gas in the chamber to make the chamber conductive in accordance with the intensity of the radiation. This causes a current flow through the chamber circuit establishing a voltage at the junction of the electrode 3 and the load resistor 4 that varies substantially and as a function of the radiation intensity.

The junction of the electrode 3 and the load resistor 4 is connected to the grid 10 of an amplifier tube 9, having also a plate 11 and a cathode 12, diagrammatically shown as a filament. The cathode is provided with a heater circuit having a battery 14, in series with a load resistor 13 and a filament supply control switch 15. The plate of the amplifier is connected through a plate supply switch 16 to the positive terminal of the source of potential 5. The cathode 12 is connected to the negative terminal of the potential source through a series of resistors 17, 18, and 19. The potential of the grid is controlled by the magnitude of the ionization current, which in turn is a function of the intensity of the radiation penetrating the envelope. This potential controls the current flow through the tube circuit, the current being greatly magnified over that flowing in the chamber circuit.

For deriving indications of the intensity of the radiation, a meter 20 is connected between the cathode 12 and a source of potential provided by resistors 18 and 19 and the resistor 22 all connected in series across the battery 6. Resistor 22 is connected through switch 16 to the positive terminal of the potential source and to a point in the cathode circuit between resistors 17 and 18. Resistor 18 is provided with a means for adjustably shorting out a portion thereof for the purpose of controlling the cathode potential. The meter is further provided with a variable by-pass resistor 21, whereby the current flow through the meter 20 may be adjusted to regulate the swing of the pointer to that of the range of the meter scale.

For providing still further adjustment of the tube bias, a variable resistor 25 is connected between the positive terminal of the source of potential 5 and the cathode circuit, at a point between resistors 18 and 19. This resistor 25 controls the flow of current through the resistor 19 and this in turn controls the potential drop therethrough.

An additional switch 30 is incorporated in the potential source 5 between the battery and the resistor 7 and ganged to the switches 15 and 16 for simultaneous movement therewith. Switch 30 serves to open the battery circuit to eliminate a drain on the battery energy when the instrument is not actually being used.

The instrument of FIG. 1 is initially calibrated at the factory and periodically thereafter against a known intensity of nuclear radiation. In this operation the various resistors and potentiometer are adjusted, as required, to obtain the correct reading or indication of the radiation intensity. The resistor 18 may be adjusted to provide zero adjustment of the meter. It is connected to the same means as controls the filament supply and plate supply switches 15 and 16 and may be operated by continued movement of said means for adjusting the meter to zero reading.

After this radiation source calibration, the instrument may become inaccurate. One cause of inaccuracy lies in the failure of the battery to produce the requisite voltage for the accurate operation of the instrument. Another cause of inaccuracy is the loss of gain in the amplifier due to the aging of the tube. Still further causes of inaccuracy are the changing of the values of the components making up the circuits. Rarely does it occur that the ionization chamber itself is the cause of inaccuracy or failure of the instrument to correctly indicate the radiation intensity. As a consequence, it appears that any means which leads to the discovery of and correction for variations of amplifier gain, variations in the components, and variations in the battery output voltage would be reliable for the purpose of maintaining the equipment in a continuous state of readiness between periodic calibrations in which a known radiation intensity is used.

Figure 2:
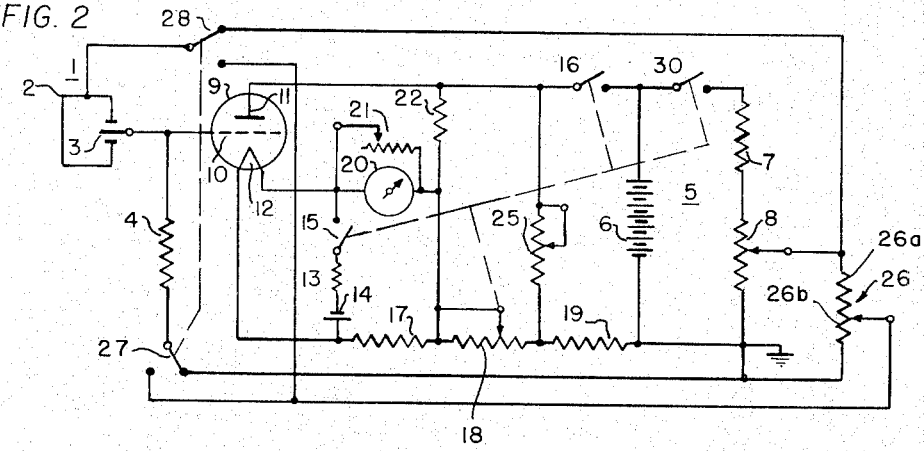
FIGURE 2 shows one form of the invention applied to the instrument of FIGURE 1.

FIGURE 2, shows the instrument of FIG. 1 modified to incorporate means therein, to enable the operator of the instrument to check it for accuracy immediately prior to taking a measurement of the radiation intensity, and to make adjustments to correct any observed inaccuracy of the instrument.

Switch means are inserted in the ionization chamber circuit, switch 28 being connected to the envelope coating of the detector and switch 27 being connected to the load resistor 4. The switches 27 and 28 are single-pole double-throw switches and are ganged for simultaneous operation. One pole of the switch 28 is connected to the variable tap of the potentiometer 8 providing the connection between the ionization chamber and the tap when the switch is in the upper position as shown in the drawing. One pole of the switch 27 is connected to the lower end of the potentiometer 8 and ground. While the switch 27 is in its upper position it connects the lower end of the ionization chamber circuit to ground and the circuit is the same as that shown in FIG. 1. The second poles of the switches 27 and 28 are connected together and to a tap of a potentiometer 26. Potentiometer 26 is connected at one end to the variable tap of the potentiometer 8 and at the other end to ground. In the lower position of the switches 27 and 28, the ionization chamber circuit is shorted and the potential as determined by the position of the taps of the potentiometers 26 and 8 is applied through the load resistor 4 to the grid of the amplifier tube 9. This voltage will produce an indication on the meter.

The position of the tap of the potentiometer 8 is adjusted at the factory or during one of the periodic calibrations of the instrument using a known radiation intensity. Immediately following this calibration, the calibration switch means is moved to the lower position and the potentiometer 26 is adjusted until the meter deflection coincides with a reference mark on the scale. The calibration intensity may be shown by a distinctive indication on the scale. The setting of the potentiometer 26 is fixed and it stays fixed until the instrument is again calibrated against a radiation source of known intensity. Thereafter, the switches 27 and 28 may be thrown to their lower position at any time to check the accuracy of the instrument. If the instrument is accurate, as determined by the meter reproducing the reading of the calibration intensity the instrument may be used. If the calibration deflection is not produced the operator need merely adjust the potentiometer 8 until the reading obtained on the meter is the same as the reading produced by the calibration intensity as indicated by the distinctive index mark on the scale of the meter. With this adjustment made, the operator then may throw the switches 27 and 28 to their upper position for measuring the unknown radiation intensity. Having just calibrated the instrument the operator will be assured that the reading is correct.

The resistors 21, 25 and 26 may be made adjustable only from within the instrument and not accessible to the operator, thus making the calibration operation a simple matter for him; since only one external potentiometer 8 need be manipulated.

Analysis of the invention reveals that it depends upon the equivalence of the ratios of two pairs of resistors. The first ratio is the resistance of the chamber 2, while subjected to a calibration radiation intensity to the value of the load resistor 4. The second ratio consists of $R_{26a}$ and $R_{26b}$, the two portions of the potentiometer 26. When these resistance ratios are equal the voltage applied to the grid of the tube by the electrical calibration circuit is equal to the voltage applied to the grid of the tube at a given dose-rate.

Once the equipment has been calibrated against a known radiation intensity, the potentiometer 26 can be adjusted to establish the reference standard, that is to equate $R_{26a}/R_{26b}$ to the ratio $R_1/R_4$. If components of sufficient precision are used, it is possible to determine the values of $R_{26a}$ and $R_{26b}$ for a prototype and achieve sufficient accuracy by using fixed resistors having the same values to provide a standard in production instruments. The use of the potentiometer 26 in the calibration system, however enables the ratio $R_{26a}/R_{26b}$ to be easily altered during a calibration against a known radiation intensity to compensate for changes in the resistance of the chamber or its load resistor 4; that is, to equate the standard anew against the detector circuit resistances.

The system of FIG. 2 enables the operator to check the instrument for accuracy no matter what the cause for inaccuracy might be. It permits the operator to make a simple adjustment to compensate for the cause of the inaccuracy. The system is independent of the voltage of the battery since the ratio $R_{26a}/R_{26b}$ is not dependent upon the voltage across it. If, during the checking of the instrument, the battery voltage happens to be low as compared with the requirements of the instrument, the low voltage impressed through the potentiometer 26 will produce a decreased indication on the meter. The operator, noting this low reading would adjust the potentiometer 8 to re-establish the meter deflection to the calibration index on the scale. This adjustment re-establishes the voltage on the chamber circuit so that when the instrument is then subjected to radiation it will correctly indicate the intensity thereof. The system thus checks the battery as well as the drift of the amplifier, if any.

Re-establishing the proper chamber voltage is exceedingly important for instruments having chambers which do not operate in a plateau region, where the chamber current is independent of applied voltage. For unsaturated chambers, the effective chamber current decreases with decreased applied voltage resulting in a reduced deflection of the meter below that representative of the radiation intensity being measured.

The corrective action of the electrical calibration circuit for reduced amplifier gain such as would be caused by aging tubes is very similar to that for reduced battery voltage. The only difference is that the chamber voltage will be slightly higher after recalibration than it was for the calibrated instrument before the amplifier gain decreased. At first glance it would appear that this would cause an improper compensation for instruments using unsaturated chambers since higher voltages necessary to deflect the meter to the reference index when applied to $R_{26a}$ and $R_{26b}$ will cause $R_1$ to increase at lower dose rates when applied to $R_1$ and $R_4$ resulting in a meter deflection below the true dose at lower dose rates. In actual practice, however, the effect is very small. The amount of voltage increase to compensate for decrease in tube gain in a typical instrument is so slight that no improper compensation can be detected. If the instrument design is such that the improper compensation should prove troublesome, it is only necessary to adjust some other parameter (such as a meter shunt) which will control the meter deflection directly instead of calibrating by controlling the amount of voltage on the grid through varying the chamber voltage.

A further refinement of the instrument which eliminates a problem which has plagued radiac equipment from the outset, is to select the combination of $R_{26a}$ and $R_{26b}$ so that they have the same temperature coefficient as $R_1$ and $R_4$ respectively. This results in absolute temperature compensation for the instrument because the operator would calibrate his instrument for the voltage applied to the grid of the tube at the prevailing temperature.

Another refinement of the invention to extend the precision of the instrument, is a compensation for changes in input impedance caused by grid current changes or any other factors which result in the actual input impedance of the amplifier being different during the measurement of radiation than that which prevails during electrical calibration. This compensation while superfluous on a coarse instrument, would certainly be desirable on a more precise instrument or one having a transistor amplifier due to the very low relative input impedance. To provide the necessary compensation, it is only necessary to present the input of the amplifier with the same impedance during electrical calibration as is present when the instrument is used to measure that amount of radiation equivalent to the electrical calibration reference point.

In FIG. 2 this is $$\frac{R_1 R_4}{R_1 + R_4}$$

since $R_1$ and $R_4$ are in parallel for the flow of grid current. In actual practice, the value of both $R_1$ and $R_4$ would be determined under conditions of actual radiation at the reference intensity. During electrical calibration, however, all grid current flows over $R_4$. In the case of negative grid current, the resulting voltage adds to the electrical calibration signal. This effective increase in signal caused by grid current is greater than when measuring radiation due to the fact that all of the grid current flows over $R_4$ when electrically calibrating. Assuming that $R_1$ is very much greater than $R_{26a}$, $R_{26b}$, it is only necessary to apply the electrical calibration signal to the grid through another resistor $R_{31}$, as shown in FIG. 3, the value of which must equal $$\frac{R_1 R_4}{R_1 + R_4}$$

This will re-establish the normal operating impedance at the tube input so that the grid bias will be exactly the same for electrical calibration as for actual measurement of that amount of radiation which would cause the same meter deflection used in electrical calibration.

Figure 3:
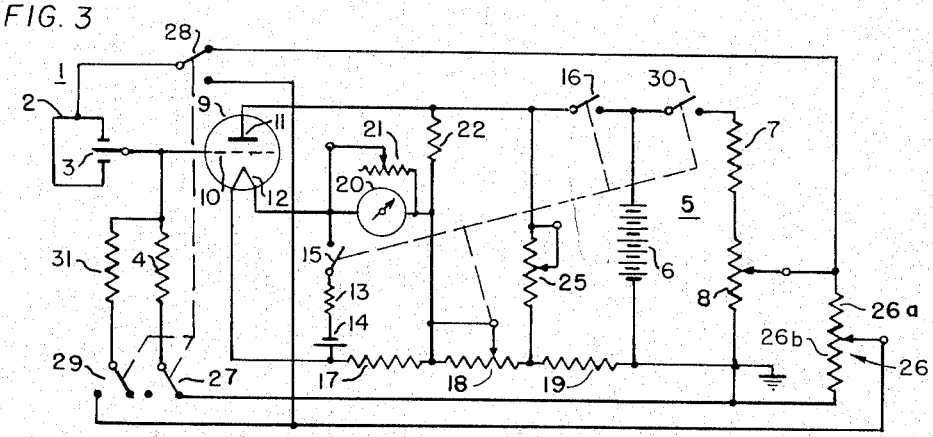
FIGURE 3 shows another form of the invention with a provision for impedance compensation of the calibration circuit.

FIG. 3 shows a resistor 31 connected at one end to the grid end of the resistor 4 and connected at its other end through an additional switch 29 to the variable tap of the potentiometer 26. The switch is ganged with the switches 27 and 28 for simultaneous operation therewith. In the lower position of the switch 29, the voltage of the tap of the potentiometer 26 is applied through the resistor 31 to the grid of the amplifier. The switch 28 in the lower position connects the chamber 2 to the lower end of resistor 31, so as to short circuit it. The lower position of switch 27 opens the circuit of the load resistor 4. Thus, during the application of test voltage, the normal operation impedance will prevail because $R_{31}$ is made equal to $$\frac{R_1 R_4}{R_1 + R_4}$$

Alternatively, resistor 4 could be left in the circuit and resistor 31 chosen with a resistance equal to the effective resistance of $R_1$ at reference radiation.

As shown in FIG. 3, the lower contact of switch 27 and the upper contact of switch 29 are left unconnected to any circuit. In the lower position of switch 27 resistor 4 is disconnected from ground.

The structure of the embodiment of the invention disclosed in FIG. 3 is otherwise the same as that disclosed in FIG. 2. The only difference is in the connection of the potentiometer 26 through switch 29 and resistor 31 to the grid of the tube 9 instead of through switch 27 and resistor 4.

The mode of operation of the two embodiments are the same.

FIG. 4 shows still another embodiment of the invention. This embodiment is still further refinement of the inventive concept and incorporates a built-in means for monitoring the battery voltage by utilizing the amplifier and meter circuit.

When the unsaturated chamber instrument is fitted with a means for monitoring the battery voltage, the method of controlling the voltage applied to the chamber to compensate for battery voltage variations and that of controlling the meter shunt to compensate for the gain loss of the amplifier are used. The means for controlling the meter shunt resistor in this embodiment may extend to the exterior of the instrument case to permit ready adjustment thereof, but should be sealed to prevent operator adjustment.

The system provides four four-position switches 27, 28, 34, and 35 ganged together for simultaneous operation. Switch 28 is connected to the chamber 2. In its first, third and fourth position, the switch is connected to the opposite end of the chamber circuit, that is, to the lower end of the load resistor 4. The second position of the switch is connected to the variable tap of the variable resistor 8 as in FIGS. 2 and 3. Switch 27 is connected to the variable tap of the potentiometer 8 and through the third position of the switch to the top end of the potentiometer 26. The other positions of the switch 27 are open circuited. The lower end of the potentiometer 26 is connected through a series resistor 31 to the variable tap of the variable resistor 32 and through a portion of said resistor to ground or to the negative terminal of the battery 6.

In the first position of the switches 27 and 28, the chamber circuit is short circuited. With switches 15 and 16 closed, only the amplifier circuit is energized. In this position of the switch, the meter may be zeroed without the presence of the environmental radiation affecting the correctness of the adjustment. For this purpose the resistor 18 is varied.

In the second position of the switches 28 and 27, the instrument is in readiness for taking a reading of the intensity of the environmental radiation. In this position of the switches the calibration circuit is disconnected from the meter circuits by the open position of the switch 27.

In the third position of the switches 27 and 28, the chamber circuit is short circuited and the top end of the potentiometer 26 is connected to the voltage supply 5 through the switch 27 and variable tap of the potentiometer 8. The variable tap of the potentiometer 26 applies the appropriate voltage to the grid 10, through the resistor 4 to produce a deflection on the meter equal to the reference index when the meter is correctly responding.

Should this not be so, the tap of the potentiometer 8 may be adjusted until the correct reading is obtained. This adjusts the voltage applied to the chamber circuit. Alternatively, the variable resistor 21 may be adjusted to compensate for changes of gain of the amplifier.

Switches 34 and 35 function for the testing of the battery voltage in a manner independent of the testing of the rest of the instrument. The switch 34 is connected to the heater circuit of the amplifier tube between the heater battery and the resistor 13. The first three positions of the switch 34 are open circuited. The fourth position of the switch connects to the other side of the heater battery through the resistor 36. When the switches are in their fourth position, the heater battery is shorted through the resistor 36.

Switch 35 is connected to the positive side of the battery through switch 16 and has its fourth position connected to the resistors 33 and 32, connected in series to ground and to the negative terminal of the battery 6. The resistor as connected from the positive side of the battery 6, provides a voltage divider. The tap of resistor 32 provides a voltage that is fed back through the resistor 31, the potentiometer 26 to the grid of the tube through resistor 4. The application of this voltage, together with the reduction of the heater current will provide a meter deflection equal to that measured by a distinctive index or reference on the scale when the battery is delivering the requisite voltage for the proper operation of the instrument. If the voltage is not high enough, the correction can be made by varying the tap of the potentiometer 8.

The chamber circuit, including the amplifier, may be housed in a separate housing as indicated by the dashed lines encompassing the elements. Connections from the elements housed in the separate housing are made, if desired, through a six pin-socket connection, one of which connects the separate housing with a connection to ground.

FIG. 5 diagrammatically illustrates the four functional positions of switches 27, 28, 34 and 35.

In operation, the function switches are thrown to their fourth position for a check of the battery voltage. Should the battery voltage be found to be low but above reject voltage, the potentiometer 8 is adjusted to the extent necessary to compensate therefor after the function switches are thrown to their third position. In this position, the calibration circuit is connected to the grid of the amplifier. The chamber circuit is shorted. With the switch in this position the meter should deflect to the distinctive index or reference. If it does not, either the battery voltage is low, or gain of the amplifier has decreased with aging tube, or the meter is sluggish in response. Correction for lack of accuracy of response caused by the infrequently occurring latter conditions is made by adjusting the resistor 21 until the radiometer is properly indicating when powered from a voltage standard or when placed in front of a radioactive source with switch in second position. This correction avoids the improper compensation that would be present should the voltage of the chamber circuit be increased *excessively* to compensate for the low gain and must be made when fresh batteries show "reject."

The three embodiments of the invention provide a calibration system for radiation survey instruments based on (*a*) a substitution for the normal signal voltage present at the amplifier input when the chamber is under a particular radiation intensity with an equivalent voltage obtained from a standardized voltage divider and (*b*) on means for altering the deflection of the indicating meter to the correct scale value.

The invention provides the following desirable advantages: a safe, less costly and simpler means for calibrating radiac equipment; a calibration system built into the instrument that will enable the operator to calibrate his instrument immediately prior to taking a reading of the radiation intensity; for confidence of the operator in the accuracy of this instrument; and for the elimination of the need to calibrate the instrument at more frequent intervals against a known source of radiation intensity and for the assurance that the instruments will be accurate when needed to measure radiation intensity.

Our invention contemplates any and all of the previously disclosed refinements in the calibration system as set forth in the appended claims.

We claim:
1. In combination with
  (a) a radiometer having a voltage supply, a detector circuit connected to said voltage supply through a potentiometer responsive to radiation from radiation sources for producing a voltage which is a function of the intensity of said radiation source, an amplifier having an input and an output with the input connected to said detector circuit and connected to said voltage source responsive to said detector circuit voltage for providing an amplified voltage at its output, a meter connected to the output of said amplifier responsive to the amplified voltage producing a current through said meter to indicate the intensity of the radiation impinging on said detector circuit, and adjustable resistor shunting said meter for regulating the current in said meter;
  (b) a means incorporated in said radiometer for testing the voltage of said voltage supply and for adjusting the voltage on said detector circuit to compensate for low voltage of said voltage supply; and
  (c) a means also incorporated in said radiometer for testing the gain of said amplifier and the response of said meter and for permitting the adjustment of said adjustable resistor to control the current through said meter to compensate for low gain of said amplifier and low response of said meter, whereby said radiometer may be made to correctly indicate the radiation intensity when used to measure radiation intensity.

2. A radiometer including a source of voltage and a component adjustable to vary the indication of said radiometer to bring it into agreement with the value of a known radiation intensity being measured for adjusting the accuracy of the radiometer;
  (a) an adjustable means incorporated in said radiometer, adjustable when connected to said radiometer to provide the same indication of said radiometer as is produced by said known radiation intensity; and
  (b) a means for simultaneously rendering said radiometer nonresponsive to radioactive sources and for connecting said adjustable means to said radiometer to provide the same indication to check the accuracy of said radiometer indication and to permit the adjustment of said radiometer component to correct the indication of said radiometer when it is not producing the same indication.

3. A radiometer having a detector for providing a voltage that is a function of radiation intensity impinging thereon, an amplifier connected to said detector circuit for amplifying the voltage thereof, a meter connected to said amplifier and responsive to said amplified voltage to produce indications of the radiation intensity, a voltage supply and a means for adjusting at least one parameter of said radiometer to correct the indication of said meter so that it will exactly indicate the value of the known radiation intensity to which the detector is exposed;
  (a) a potentiometer in said radiometer connected to said voltage supply, adjustable to establish a voltage equal to the voltage produced by the detector circuit while the detector circuit is exposed to said known radiation intensity; and
  (b) a means for disabling said detector circuit and simultaneously connecting said potentiometer to the input of said amplifier for providing a like indication on said meter when said radiometer is functioning accurately and for permitting adjustment of said means for adjusting the one parameter to correct the indication of said meter when the indication of said meter does not give the same indication as was produced by the known source of radiation intensity.

4. A radiometer having a detector circuit for providing a voltage in accordance with a function of radiation intensity impinging thereon, an amplifier circuit having its input connected to the detector circuit and responsive to said detector circuit voltage for providing an amplified voltage proportional to its input voltage, said detector circuit providing a given impedance to said amplifier input, a meter connected to said amplifier circuit and responsive to said applied voltage to provide an indication of the value of the intensity of said radiation, a source of voltage supply connected to said detector circuit, amplifier and meter, and means for adjusting at least one parameter of said radiometer to correct the indication of the meter to read the radiation intensity value of the radiation impinging on said detector circuit;
   (a) a potentiometer incorporated in said radiometer and connected to said source of voltage, adjustable immediately after the radiometer is calibrated against a known source of radiation intensity to establish its accuracy, to establish a voltage equal to that which is produced by said detector circuit while said known source of radiation intensity is impinging on said detector;
   (b) an impedance means for assuring that the potentiometer imposes the same impedance on the input of the amplifier during its connection thereto connected to said potentiometer; and
   (c) means for simultaneously disabling said detector circuit and connecting said potentiometer to the input of said amplifier through said impedance means for checking the gain of said amplifier circuit and the response of said meter to correct the indication of said meter so that it is accurate and for permitting adjustment of said one parameter to correct the indication of said meter so that it indicates the same value as is indicated when the detector circuit is subjected to the known radiation intensity.

5. A radiometer and calibrating means therefor comprising:
   (a) a detector circuit for producing a voltage indicative of the intensity of radiation intensity being measured;
   (b) an amplifier circuit connected at its input to the detector circuit and responsive to provide an amplified voltage therefrom;
   (c) a meter in the amplifier circuit, responsive to said amplified voltage for indicating the intensity of the radiation being measured;
   (d) a source of voltage connected to said detector and amplifier circuits;
   (e) means for varying the voltage applied to the detector and amplifier circuits to cause said meter to read correctly a known radiation intensity while said known radiation intensity is present in the environment of the radiometer;
   (f) a means incorporated in the instrument and connected to said source of voltage, adjustable for producing the same voltage at the input of said amplifier circuit as the voltage produced by said known radiation when impinging on said detector to obtain the same indication;
   (g) means for disabling said detector circuit and for connecting said last named means to the input of said amplifier circuit to provide the same indication as is obtained when the detector is subjected to said known radiation intensity when the meter and amplifier are correctly responding and for permitting said means for varying the voltage applied to said detector and amplifier circuits to be varied to correct said indication when it is in error.

6. A radiometer having a calibration means therewith comprising:
   (a) a detector circuit for providing a voltage which is a function of the radiation intensity of radiation impinging thereon;
   (b) an amplifier circuit having its input circuit connected to said detector circuit and responsive to the voltage thereof for providing an amplified voltage proportional to the input voltage;
   (c) a meter connected to the amplifier circuit and responsive to a current flow therethrough as a result of said amplifier voltage for indicating the radiation intensity;
   (d) an adjustable source of voltage having a battery, said adjustable source of voltage being connected to said detector circuit for providing operating voltage thereacross;
   (e) adjustable resistor means shunting said meter for adjusting the current flow through said meter to compensate for changes of gain of said amplifier and changes of response in said meter;
   (f) means incorporated in said radiometer, utilizing said amplifier circuit and meter for checking the voltage of said battery and for permitting said adjustable source of voltage to be adjusted for purposes of providing the proper voltage across said detector circuit;
   (g) means also incorporated in said radiometer connected to said adjustable source of voltage for providing a voltage equal to the voltage applied to the amplifier input when said detector circuit is subjected to known radiation intensity; and
   (h) means for simultaneously disabling said detector circuit and for selectively connecting each of said incorporated means for respectively checking said battery voltage and making corrections for low voltage on said detector circuit and checking the gain of said amplifier and response of said meter and making compensation of the current through said meter for a low gain response and low response of said meter.

References Cited
UNITED STATES PATENTS

| | | | |
|---|---|---|---|
| 2,955,206 | 10/1960 | Spergel et al. | 250—83.6 X |
| 2,974,232 | 3/1961 | Minowitz | 250—83.6 |

ARCHIE R. BORCHELT, *Primary Examiner.*